United States Patent [19]
Nir

[11] Patent Number: 6,101,984
[45] Date of Patent: Aug. 15, 2000

[54] FLUID HEATER AND METHOD OF HEATING FLUID

[76] Inventor: Ari Nir, 5800 Arlington Ave., Apt. 4B, Riverdale, N.Y. 10471

[21] Appl. No.: 09/429,102

[22] Filed: Oct. 28, 1999

[51] Int. Cl.$^7$ ..................................................... F22B 1/02
[52] U.S. Cl. ................... 122/31.1; 122/15.1; 122/367.1; 237/19; 165/140; 165/163
[58] Field of Search .................................. 122/15.1, 19.1, 122/19.2, 31.1, 367.1; 237/19; 165/140, 163

[56] References Cited

U.S. PATENT DOCUMENTS

| | | | |
|---|---|---|---|
| 5,626,102 | 5/1997 | Nir | 122/7 R |
| 5,893,411 | 4/1999 | Nir | 165/140 |

*Primary Examiner*—Denise L. Ferensic
*Assistant Examiner*—Jiping Lu
*Attorney, Agent, or Firm*—I. Zborovsky

[57] ABSTRACT

A fluid heater, comprising a tank having an inner chamber for accommodating a fluid to be heated, a heat exchanger having a tube bundle and a shell surrounding the tube bundle, the shell being introduced in the tank so that a wall of the shell is in contact with the fluid in the interior of the tank, the shell having an inlet for introducing a heating fluid, the tube bundle having an outlet which communicates through an upwardly raising pipe with the interior of the tank and an inlet for introducing a fluid to be heated, so that when the heating fluid is introduced through the inlet of the shell into the shell heat of the heating fluid is transferred through the wall of the shell to the fluid in the interior of the tank and also heats the fluid inside the tube bundle so that the heated fluid from the tube bundle is supplied through the upwardly raising pipe into the interior of the tank, providing a heat transfer between the heating and heated fluid by forced and natural convection simultaneously.

6 Claims, 3 Drawing Sheets

FLUID HEATER AND METHOD OF HEATING FLUID

BACKGROUND OF THE INVENTION

The present invention relates to a fluid heater and a method of heating fluid.

More particularly, it relates to fluid heaters which are widely used in HVAC and other industries. Usually the heater is formed as a storage tank with a built-in heat exchanger and a pump for circulating fluid through the shell side of the heat exchanger and the storage space. The fluid is heated by the heat transfer area created by the external surface of the tube bundle. The disadvantage of such fluid heaters is that it needs an additional circulating pump.

SUMMARY OF THE INVENTION

Accordingly, it is an object of the present invention to provide a fluid heater and a method of heating fluid which has a variable fluid consumption without the use of a circulating pump.

In keeping with these objects and with others which will become apparent hereinafter, one feature of present invention resides, briefly stated in a fluid heater which has a vertical or horizontal tank having an inner chamber for accommodating a fluid to be heated, a heat exchanger having a tube bundle and a shell surrounding the tube bundle, the shell being introduced in the tank so that a wall of the shell is in contact with the fluid in the interior of the tank, the shell having an inlet for introducing a heating fluid, the tube bundle having an outlet which communicates through an upwardly raising pipe with the interior of the tank and an inlet for introducing a fluid to be heated so that when the heating fluid is introduced through the inlet of the shell into the shell, heat of the heating fluid is transferred through the wall of the shell to the fluid in the interior of the tank and also heats the fluid inside the tube bundle so that the heated fluid from the tube bundle is supplied through the upwardly raising pipe into the interior of the tank.

It is another feature of present invention to provide a method of heating a fluid shell of a heat exchanger is introduced in a tank so that a wall of the shell is in contact with the fluid in the interior of the tank, a heating fluid is introduced through an inlet of the shell into the shell so that heat of the heating fluid is transferred through a wall of the shell to the fluid in an interior of the tank and also heats the fluid inside a tube bundle located in the shell so that the heated fluid from the tube bundle is supplied through an upwardly raising pipe into the interior of the tank.

When the fluid heater is designed in accordance with the present invention and a heating method is performed in accordance with the present invention, a variable fluid consumption is provided without the use of a circulating pump.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
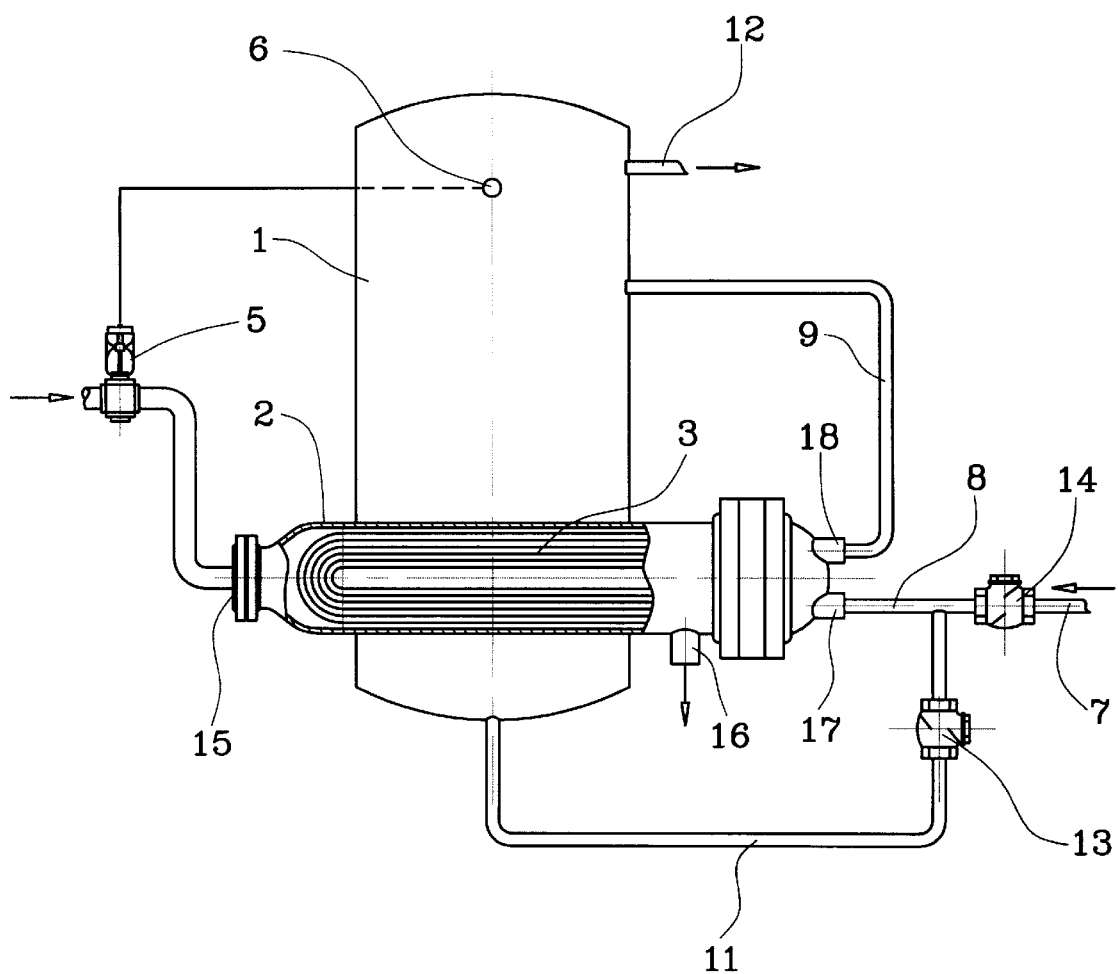
FIG. 1 is a view showing a fluid heater in accordance with one embodiment of the present invention.

With reference to FIG. 1, a fluid heater in accordance with the present invention has a storage tank which is identified with reference numeral 1. It accumulates a fluid to be heated. The fluid inside the storage tank 1 is heated by means of a built-in heat exchanger which includes a shell 2 and a tube bundle 3. The heat exchanger is arranged substantially inside the storage tank so that the wall of the shell 2 is in direct contact with the fluid which is accumulated in the storage tank 1.

The shell 2 has a shell inlet 15 for supplying a heating fluid, such as for example steam, and a shell outlet 16 for withdrawing of the heated fluid. The tube bundle 3 has a tube bundle inlet 17 for supplying a cold fluid from an external source through pipes 7 and 8 provided with a check valve 14. The tube bundle also has a tube bundle outlet 18 which communicates through an upwardly raising pipe 9 with the interior of the tank 1. A supply pipe of the heating fluid is provided with a temperature regulator 5 which operates based on temperature data received from a temperature sensor 6 located in the interior of the tank 1. The tank 1 has an outlet for the fluid which is heated in the tank, which communicates through a pipe 12 with a consumer via a tampering valve 4. A pipe 11 communicates a bottom region of the tank 1 in which usually a relatively cold fluid is accumulated with the pipe 8 through the check valve 13 tube bundle It can also communicate with the pipe 10 which leads to the tampering valve 4 bundle inlet 17.

Figure 2:
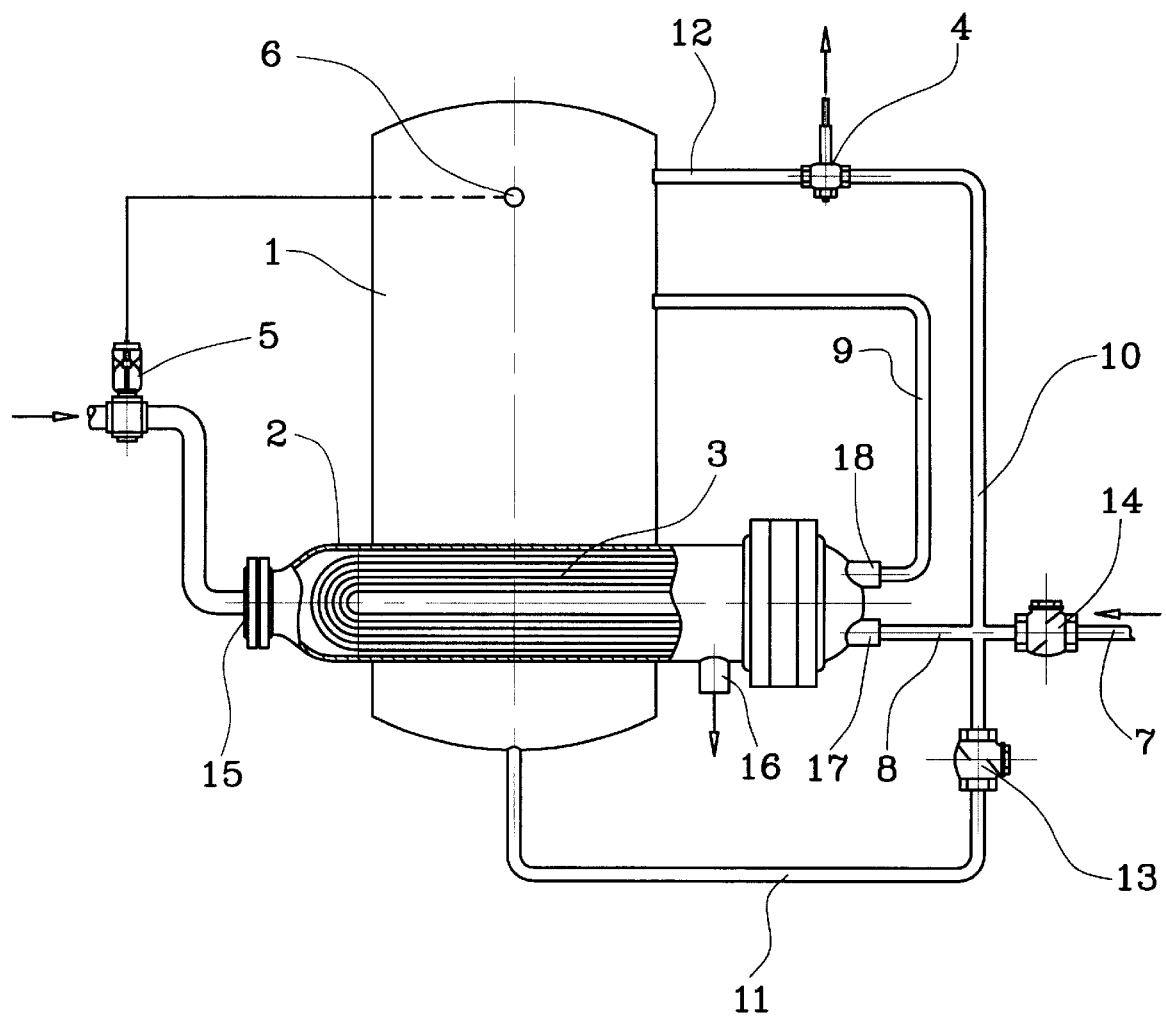
FIG. 2 is a view showing a fluid heater in accordance with another embodiment of the present invention.

In the embodiment of FIG. 2 fluid (liquid) to be heated is accumulated in the storage tank 1. Steam or another heating fluid enters the interior of the shell 2 through the shell inlet 15 and is cooled by the fluid which passes through the tubes of the tube bundle 3, and then it leaves the shell through the shell outlet 16. When there is a consumption of hot fluid stored in the tank 1, it passes via the pipe 12 directly to the consumer as shown in FIG. 1, or to the tampering valve 4, where it is mixed with the cold fluid entering the tampering valve via the pipe 10 as shown in FIG. 2. The cold fluid which is supplied from the external source through the tube bundle inlet 17 into the tubes of the tube bundle 3 is heated up to a desired temperature, and then leaves the tube bundle 3 via the tube bundle outlet 18. Then the heated liquid is directed toward the storage tank 1 via the raising pipe 9. During this process, the fluid is heated within the tube of the tubes bundle 3 by forced convection heat transfer and via the external surface of the shell 2 by natural convection heat transfer.

When the consumption of the heated liquid from the tank 1 to the consumer is temporarily terminated, heating must compensate heat losses through the walls of the storage tank. As long as the temperature of the stored fluid is below the requested temperature, the temperature regulator 5 provides the heating fluid to the shell 2, heating the stored fluid by the external surface of the shell and within the tubes of the tube bundle 3 by natural convection heat transfer.

Because of the temperature stratification of the stored fluid in the storage tank, the coolest portion of stored fluid in the tank is located in the bottom region of the tank. It passes through the recirculating pipes 11 and 8 and enters the tubes of the tube bundle 3 through the tube bundle inlet 17.

The heated fluid again returns to the storage tank 1 via the tube bundle outlet 18 and the pipe 9. This recirculation of the fluid via the tube bundle generates natural convection heat transfer, until the temperature regulator 5, based on the temperature sensed by the sensor 6, stops the supply of the heating fluid to the shell 2. In any case, heat transfer occurs through the heat transfer area created by the external surface of the shell 2 and the internal surface of the tube bundle 3.

Figure 3:
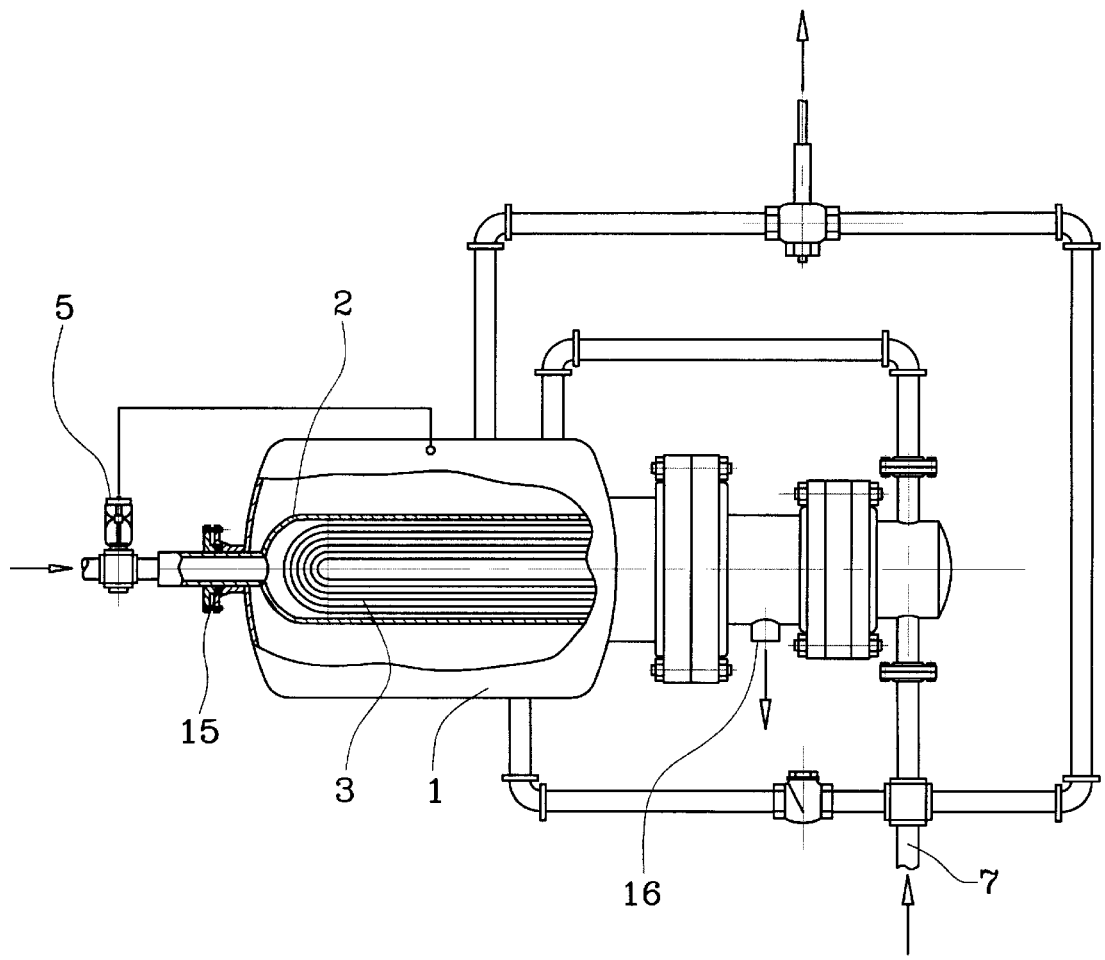
FIG. 3 is a view showing a fluid heater in accordance with a further embodiment of the present invention.

The external surface of the shell 2 can be extended by fins 19 shown for example in FIG. 3. FIG. 2 shows another embodiment of the present invention in which the system is installed horizontally. The storage tank 1' has an opening with a hermetic sealing 19 to provide the inlet of the heating fluid and to guarantee free thermal expansion of the shell 2' in a horizontal direction. The shell 2' can be connected to the storage tank 1 by flanges 20, so as to provide easy disassembly of the heat exchanger from the storage tank.

While in the embodiment of FIG. 2 the fluid heater is provided with the tempering valve 4, in the embodiment of FIG. 1 there is no tempering valve. Actually, it is not necessary to have the tempering valve in all cases. It is needed only when the temperature in the tank is higher than the temperature of consumption. The overheating of water in the tank allows to reduce its volume as the quantity of accumulated heat. Usually, in the system of heating water supply, water is heated to from 40° F.–140° F. If the temperature of storage of water in the tank is 140° F., the tampering valve is not needed. However, water can be also heated in the tank to 200° F. In this case, it is necessary to mix it with cold water in order to obtain a mixture with the temperature of 140° F. In this case, the volume of the tank is reduced by the value:

$$\frac{140-40}{200-40} = \frac{100}{160} = 0.625$$

It will be understood that each of the elements described above, or two or more together, may also find a useful application in other types of constructions differing from the types described above.

While the invention has been illustrated and described as embodied in fluid heater, and method of heating fluid, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fluid heater, comprising a tank having an inner chamber for accommodating a fluid to be heated; a heat exchanger having a tube bundle and a shell surrounding said tube bundle, said shell being introduced in said tank so that a wall of said shell is in contact with the fluid in the interior of said tank, said shell having an inlet for introducing a heating fluid, said tube bundle having an outlet which communicates through an upwardly raising pipe with the interior of said tank and an inlet for introducing a fluid to be heated, so that when the heating fluid is introduced through said inlet of said shell into said shell heat of said heating fluid is transferred through the wall of said shell to the fluid in the interior of said tank and also heats the fluid inside the tube bundle so that the heated fluid from said tube bundle is supplied through said upwardly raising pipe into the interior of said tank.

2. A fluid heater as defined in claim 1, wherein said tank has an outlet located in a bottom region of said tank and communicating with said inlet of said tube bundle so that a relatively cold fluid from said bottom region of the tank can be supplied into said tube bundle.

3. A fluid heater as defined in claim 2, and further comprising a tampering valve arranged so that the heated fluid is supplied through said outlet of said tank to said tampering valve, and a cold fluid from an external source is supplied to said tampering valve to mix with the heated fluid to thereafter be supplied to a consumer.

4. A fluid heater as defined in claim 1, wherein said inlet of said tube bundle has a pipe communicating with a source of the fluid to be heated.

5. A fluid heater as defined in claim 1, and further comprising a temperature sensor located in said tank and a temperature regulator arranged in a supply line of the heating fluid so as to regulate a supply of the heating fluid sensed by said temperature sensor in dependence on a temperature of the fluid inside said tank.

6. A method of heating fluid in a tank, comprising the steps of arranging in the tank for a heat exchanger having a tube bundle and a shell surrounding said tube bundle, with said shell being introduced in said tank so that a wall of said shell is in contact with the fluid in the interior of said tank; introducing a fluid to be heated into said tube bundle; introducing a heating fluid shell into said shell so that heat of said heating fluid is transferred through a wall of said shell to the fluid in the interior of said tank and also heats the fluid inside the tube bundle; and supplying the heated fluid from said tube bundle through an upwardly raising pipe into the interior of said tank.

* * * * *